(12) United States Patent
Mortensen

(10) Patent No.: US 6,591,113 B1
(45) Date of Patent: Jul. 8, 2003

(54) OPERATING A CELLULAR TELECOMMUNICATION SYSTEM

(75) Inventor: Ivar Mortensen, Korntal (DE)

(73) Assignee: Alcatel, Paris (FR)

( * ) Notice: Subject to any disclaimer, the term of this patent is extended or adjusted under 35 U.S.C. 154(b) by 361 days.

(21) Appl. No.: 09/697,494

(22) Filed: Oct. 27, 2000

(30) Foreign Application Priority Data

Jul. 20, 2000 (EP) .............................................. 00440216

(51) Int. Cl.[7] .............................. H04B 7/00; H04Q 7/20
(52) U.S. Cl. ............................ 455/522; 455/63; 455/88
(58) Field of Search ............................. 455/63, 69, 88, 455/420, 422, 522; 370/311, 320, 335, 342, 441, 479

(56) References Cited

U.S. PATENT DOCUMENTS

| | | | |
|---|---|---|---|
| 5,524,275 A | 6/1996 | Lindell | ........................ 455/115 |
| 5,621,723 A | * 4/1997 | Walton et al. | ............... 370/335 |
| 6,198,928 B1 | * 3/2001 | Keurulainen et al. | ........ 455/436 |

FOREIGN PATENT DOCUMENTS

| | | |
|---|---|---|
| EP | 0 926 842 A2 | 6/1999 |
| WO | WO 00/38348 | 6/2000 |

* cited by examiner

Primary Examiner—Quochien Vuong
(74) Attorney, Agent, or Firm—Sughrue Mion, PLLC

(57) ABSTRACT

A method of operating a cellular telecommunication system is described, wherein one base station communicates with at least one mobile station, and wherein the power level of the transmission is increased and decreased by requests of the mobile station. The transmission includes at least two channels (DPDCH, DPCCH), e.g data and control. One of the two channels (DPDCH) is turned off if the power level of the transmission reaches a first maximum value (DPDCH-MAX).

9 Claims, 1 Drawing Sheet

OPERATING A CELLULAR TELECOMMUNICATION SYSTEM

BACKGROUND OF THE INVENTION

The invention relates to a method of operating a cellular telecommunication system wherein one base station communicates with at least one mobile station, wherein the transmission includes at least two channels, and wherein the power level of the transmission is increased and decreased by requests of the mobile station. The invention also relates to a corresponding cellular telecommunication system and a base station.

In Direct Sequence Code Division Multiple Access (DS-CDMA) cellular telecommunication systems, a mobile station communicates in a so-called macrodiversity mode with a number of base stations. In order to keep the power levels of the combined signal received by the mobile station from the base stations at least similar, an inner-loop transmission power control is established. This control creates a transmission power control (TPC) signal which is sent from the mobile station to the base stations. Each one of the base stations then increases or decreases its power level depending on the TPC signal.

DS-CDMA telecommunication systems usually include a data channel (DPDCH) and a control channel (DPCCH). The power levels of these two different channels are increased and decreased in conjunction. This may lead to disadvantages, in particular in the downlink direction.

SUMMARY OF THE INVENTION

It is an object of the invention to provide a method for operating a telecommunication system which has an improved control of the power level of the transmission.

For a method as described above, this object is solved according to the invention in that one of the two channels is turned off if the power level of the transmission reaches a first maximum value. For a telecommunication system as described above, this object is solved accordingly by the invention.

If the first maximum value is reached it may be assumed that the base station is not able to satisfy the needed power to be received by the mobile station. In this situation, it may as well be assumed that the transmission from the base station to the mobile station is not received well at the mobile station. Therefore, it makes no sense to continue the transmission.

The invention is able to recognize this situation and then to consequently turn off the transmission from the base station to the mobile station. Thereby, the power consumption of the base station is reduced and other mobile stations are not disturbed anymore by the turned-off transmission.

It is advantageous if the one of the two channels is only turned off if the power level of the transmission reaches the first maximum value and if the mobile station still requests a further increase of the power level.

The inventive method thereby includes the additional feature that the transmission is only turned off, if the mobile station still requests for a further increase of the power level. However, if this is not the case, the transmission is not turned off. This means in other words, that the invention provides another trial whether the mobile station still needs more power after the first maximum value is reached. With this further trial it is possible to avoid the turn-off of a transmission, if the power level requested by the mobile station does not exceed the first maximum value too much.

Furthermore, it is advantageous if the power level of the other one of the two channels is limited to a second maximum value. As well, it is advantageous if the one of the two channels is turned on again if the power level of the transmission becomes smaller than the second maximum value or than a turn-on value which is smaller than the second maximum value.

BRIEF DESCRIPTION OF THE DRAWINGS

Further embodiments as well as further advantages of the invention are outlined in the following description of the enclosed figures.

DETAILED DESCRIPTION OF THE INVENTION

In a Direct Sequence Code Division Multiple Access (DS-CDMA) cellular telecommunication system, one and the same mobile station (MS) may communicate with a number of base stations (BTS) at the same time in a so-called macrodiversity mode. However, due to the different distances of the base stations from the mobile station it is possible that the power levels of the different signals transmitted from the base stations to the mobile station are also different. Transmission power control methods are used with the goal to influence all transmitted signals such that the power levels of all signals are similar at the mobile station. This leads to the fact that the mobile station requests an increase or a decrease of the power levels of the different base stations if the location of the mobile station is changed.

For that purpose, in an inner-loop transmission power control method an actual signal-to-interference ratio (SIR) value of the combined signal received from the base stations is measured by the mobile station. Then, the measured SIR value is compared to a target SIR value and a transmit power control (TPC) signal is generated using a TPC algorithm. This TPC signal is transmitted as control data (DPCCH) of the CDMA signal from the mobile station back to the base stations. Then, the power level of the base stations is adjusted according to the received TPC signal, i.e. the power level of the transmission of the base station is increased ("TPC up") or decreased ("TPC down").

Figure 1:
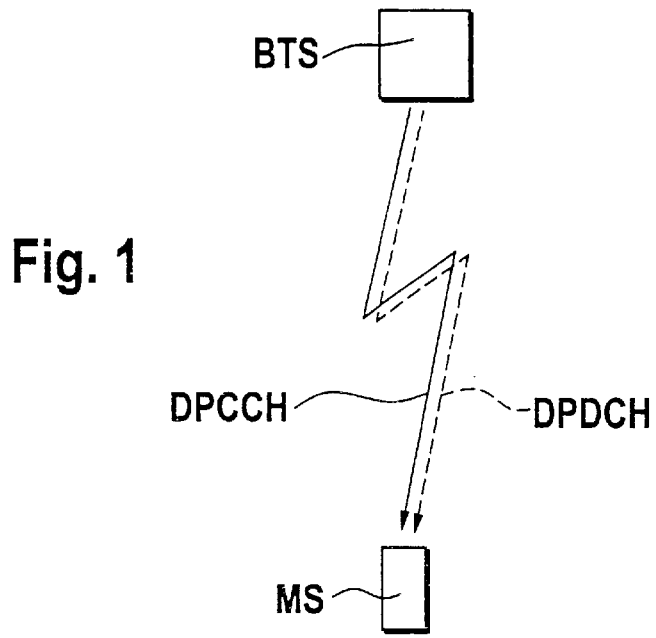
FIG. 1 shows a schematic block diagram of an embodiment of a part of a downlink connection of a base station and a mobile station according to the invention.

FIG. 1 shows a downlink connection from a base station BTS to a mobile station MS. The connection carries at least two channels, i.e. the mentioned control channel DPCCH and a data channel DPDCH.

Figure 2:
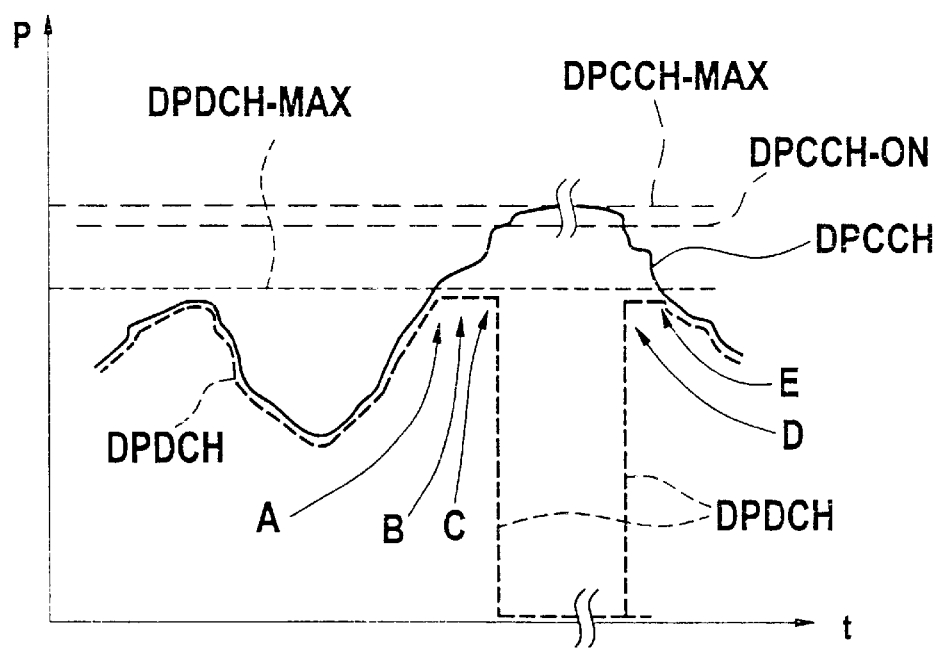
FIG. 2 shows a schematic time diagram of power levels of the base station of FIG. 1 operating according to the inventive method.

In order to adjust the power levels of the different channels DPCCH, DPDCH of FIG. 1, a method is used which will be explained in connection with FIG. 2. In FIG. 2, the power levels P of the two different channels DPDCH and DPCCH of FIG. 1 are depicted over the time t.

As can be seen in FIG. 2, the power levels of the two different channels DPDCH, DPCCH are—except the situation described below—always increased and decreased together. Furthermore, according to FIG. 2, the power levels of the channels DPDCH, DPCCH are—except the situation described below—always the same.

However, it has to be mentioned that the power levels of the two channels DPDCH, DPCCH may also be different with a fixed offset inbetween. In the following description, the offset is selected to be zero so that—as mentioned—the two power levels are the same. If the offset would be greater than zero, the following description would have to be adapted correspondingly.

A first and a second maximum value DPDCH-MAX, DPCCH-MAX exists for each one of the power levels of the two different channels DPDCH, DPCCH. The maximum value DPCCH-MAX of the control channel DPCCH is greater than the maximum value DPDCH-MAX of the data channel DPDCH. Furthermore, a turn-on value DPCCH-ON exists which is smaller than the maximum value DPCCH-MAX of the control channel DPCCH.

As long as the power levels of the two different channels DPDCH, DPCCH are below the maximum value DPDCH-MAX, these two power levels are identical and follow each other. However, as soon as the power levels of the two channels DPDCH, DPCCH reach the maximum value DPDCH-MAX the following procedure is performed:

As long as the mobile station MS does not request an increase of the power level, the two channels DPDCH, DPCCH remain identical.

As soon as the mobile station MS requests a further increase of the power level, only the power level of the control channel DPCCH is increased. The power level of the data channel DPDCH, however, remains on the power level of the maximum value DPDCH-MAX. This is shown in FIG. 2 in connection with reference numeral A.

If, then, the mobile station MS does not continue to request for an increase of the power level, the power level of the data channel DPDCH remains on the power level of the maximum value DPDCH-MAX. This is shown in FIG. 2 in connection with reference numeral B.

However, if the mobile station MS still requests an increase of the power level and thereby becomes greater than the power level of the maximum value DPCCH-MAX, then the power level of the data channel DPDCH is turned off to zero or at least to a minimum value. This is shown in FIG. 2 in connection with reference numeral C.

Independently of the power level of the data channel DPDCH, the power level of the control channel DPCCH is limited to the maximum value DPCCH-MAX.

As soon as the power level of the control channel DPCCH again becomes smaller than the turn-on value DPCCH-ON due to requests for a decrease of the power level by the mobile station MS, the data channel DPDCH is turned on again to the power level of the maximum value DPDCH-MAX. This is shown in FIG. 2 in connection with reference numeral D.

As soon as the power level of the control channel DPCCH becomes smaller than the power level of the maximum value DPDCH-MAX due to further requests for a decrease of the power level by the mobile station MS, the power level of the data channel DPDCH becomes identical to the power level of the control channel DPCCH and both power levels follow each other again. This is shown in FIG. 2 in connection with reference numeral E.

The reason for this procedure is the following:

If the maximum value DPDCH-MAX is reached, the power level of the two channels DPDCH, DPCCH actually should not be increased anymore. However, the above described procedure makes one or more further trials by only increasing the power level of the control channel DPCCH. If, after that or these trials, the mobile station still requests an increase of the power level, then it may be assumed that the base station BTS is not able to increase the power level to such an extent that the mobile station MS is satisfied. However, this has the consequence that the mobile station MS does not receive enough power so that it may be assumed that the data sent on the data channel DPDCH from the base station BTS to the mobile station MS is not received well. In this situation, the above described procedure turns off the transmission of data from the base station BTS to the mobile station MS as this transmission has no sense anymore.

As soon as the base station BTS is able again to transmit enough power to the mobile station MS, the transmission of data from the base station BTS to the mobile station MS is turned on again. Then, the turned-off transmission is started at that point in time at which it was turned off, or the entire turned-off transmission is repeated as described below.

The transmission of data from the base station BTS to the mobile station MS is performed in so-called transmission time intervalls TTI's. One such TTI includes up to 8 frames. One such frame includes 15 slots and has a duration of e.g. 10 milliseconds.

The procedure as described above may be performed at the beginning of every TTI. During the slots of the first frame of this respective TTI, it is decided whether the transmission is turned off or not. If the transmission is turned off, this turn-off is upheld until the end of the respective TTI, i.e. for the rest of the frames of the respective TTI. Then, after the transmission is turned on again, the turned-off TTI is transmitted again in total.

Additionally it is possible to uphold the turn-off of the transmission even for the next TTI, if, at the end of the respective TTI, the power level of the control channel DPCCH is still not smaller than the power level of the maximum value DPCCH-MAX.

The advantages of the described procedure are as follows:

As soon as the base station BTS turns off the transmission of data from the base station BTS to the mobile station MS, no further power is needed anymore in the base station for this transmission. Therefore, the power consumption is reduced in the base station BTS. As well, the turned-off transmission does not influence any other transmission anymore. In particular, the turned-off transmission does not disturb the transmission to other mobile stations anymore. However, the turn-off of the transmission of data from the base station BTS to the mobile station MS does not have a severe impact on the entire transmission of data as this turned-off transmission very probably would not have been successful anyway, and as the turned-off transmission is restarted or repeated afterwards so that no data to be transmitted is lost.

It has to be added that the described procedure may not only be used in connection with the transmission from the base stations to the mobile station, but also vice versa.

What is claimed is:

1. A method of operating a cellular telecommunication system wherein one base station (BTS) communicates with at least one mobile station (MS), wherein the transmission includes at least two channels (DPDCH, DPCCH), and wherein the power level of the transmission is increased and decreased by requests of the mobile station (MS), characterized in that one of the two channels (DPDCH) is turned off if the power level of the transmission reaches a first maximum value (DPDCH-MAX).

2. The method of claim 1, characterized in that the one of the two channels (DPDCH) is only turned off if the power level of the transmission reaches the first maximum value (DPDCH-MAX) and if the mobile station (MS) still requests a further increase of the power level.

3. The method of claim 1, characterized in that the power level of the other one of the two channels (DPCCH) is limited to a second maximum value (DPCCH-MAX).

4. The method of claim 3, characterized in that the second maximum value (DPCCH-MAX) is greater than the first maximum value (DPDCH-MAX) if the power levels of the two channels (DPDCH, DPCCH) have no offset.

5. The method of claim 3, characterized in that the one of the two channels (DPDCH) is turned on again if the power level of the transmission becomes smaller than the second maximum value (DPCCH-MAX).

6. The method of claim 3, characterized in that the one of the two channels (DPDCH) is turned on again if the power level of the transmission becomes smaller than a turn-on value (DPCCH-ON) which is smaller than the second maximum-value (DPCCH-MAX).

7. The method of one of claims 1 to 6, characterized by its use in both directions, i.e. from the base station (BTS) to the mobile station (MS) and vice versa.

8. A cellular telecommunication system wherein one base station (BTS) communicates with at least one mobile station (MS), wherein the transmission includes at least two channels (DPDCH, DPCCH), and wherein the power level of the transmission is increased and decreased by requests of the mobile station, characterized in that one of the two channels (DPDCH) is turned off if the power level of the transmission reaches a first maximum value (DPDCH-MAX).

9. A base station (BTS) which communicates with at least one mobile station (MS), wherein the transmission includes at least two channels (DPDCH, DPCCH), and wherein the power level of the transmission is increased and decreased by requests of the mobile station, characterized in that one of the two channels (DPDCH) is turned off if the power level of the transmission reaches a first maximum value (DPDCH-MAX).

* * * * *